(12) United States Patent
Jackson et al.

(10) Patent No.: US 6,755,448 B2
(45) Date of Patent: Jun. 29, 2004

(54) BLOWOUT LATCH (75) Inventors: Frank T. Jackson, Lake Elsinore, CA (US); Timothy Scott Rozema, Ladera Ranch, CA (US)

(73) Assignee: Hartwell Corporation, Placentia, CA (US)

( * ) Notice: Subject to any disclaimer, the term of this patent is extended or adjusted under 35 U.S.C. 154(b) by 0 days.

(21) Appl. No.: 10/174,129

(22) Filed: Jun. 18, 2002

(65) Prior Publication Data

US 2002/0195827 A1 Dec. 26, 2002

Related U.S. Application Data (60) Provisional application No. 60/299,541, filed on Jun. 20, 2001.

(51) Int. Cl.$^7$ .............................................. E05C 19/12
(52) U.S. Cl. .................. 292/113; 292/247; 292/341.12; 292/DIG. 11; 244/129.4; 244/53 B; 244/110 B
(58) Field of Search ................................ 292/113, 247, 292/250, 249, 341.15, 341.12, 341.13, 341.18, DIG. 11; 244/129.4, 129.53 B, 110 B (56) References Cited

U.S. PATENT DOCUMENTS

| | | |
|---|---|---|
| 4,099,751 A | 7/1978 | Poe et al. |
| 4,116,479 A | 9/1978 | Poe |
| 4,130,260 A | 12/1978 | Poe |
| 4,130,307 A | 12/1978 | Poe et al. |
| 4,183,564 A | 1/1980 | Poe |
| 4,220,364 A | 9/1980 | Poe |
| 4,307,905 A | 12/1981 | Poe et al. |
| 4,318,557 A | 3/1982 | Bourne et al. |
| 4,365,831 A | 12/1982 | Bourne |
| RE31,935 E | 7/1985 | Poe |
| 4,530,529 A | 7/1985 | Poe et al. |
| 4,548,435 A | 10/1985 | Bourne |
| 4,602,812 A * | 7/1986 | Bourne ...................... 292/113 |
| 4,752,091 A | 6/1988 | Jackson |
| 4,759,574 A | 7/1988 | James |
| 4,826,221 A | 5/1989 | Harmon |
| 4,828,299 A | 5/1989 | Poe |
| 4,911,485 A | 3/1990 | Wasilewski |
| 4,979,766 A | 12/1990 | Wasilewski |
| 4,991,885 A | 2/1991 | Poe |
| 5,016,931 A | 5/1991 | Jackson |
| 5,152,559 A | 10/1992 | Henrichs |
| 5,620,212 A | 4/1997 | Bourne et al. |
| 5,765,883 A | 6/1998 | Dessenberger et al. |
| 5,984,382 A | 11/1999 | Bourne et al. |
| 6,279,971 B1 * | 8/2001 | Dessenberger, Jr. .......... 292/113 |
| 6,325,428 B1 | 12/2001 | Do |
| 6,343,815 B1 * | 2/2002 | Poe ........................... 292/113 |
| 6,513,841 B1 * | 2/2003 | Jackson ...................... 292/214 |

* cited by examiner

*Primary Examiner*—William L. Miller
*Assistant Examiner*—Dinesh N Melwani
(74) *Attorney, Agent, or Firm*—Barnes & Thornburg LLP (57) ABSTRACT

A blowout latch is provided to latch a first panel to a second panel. The latch is coupled to the first panel and engaged with the second panel. The latch includes a biasing mechanism which is disengagable under pressure to move the first panel relative to the second panel. The latch may also be selectively disengaged with a lesser force than that required to overcome the biasing mechanism by bypassing the biasing mechanism. When manually disengaged, the latch maintains a biasing load on a bolt of the latch. A trigger of the latch is provided to bypass the biasing mechanism and disengage a roller assembly of the latch from the second panel.

17 Claims, 11 Drawing Sheets

BLOWOUT LATCH

CROSS REFERENCE TO RELATED APPLICATION

This application claims priority under 35 U.S.C. 119(e) to U.S. Provisional Application Serial No. 60/299,541, filed Jun. 20, 2001, which is expressly incorporated by reference herein.

BACKGROUND

This disclosure relates to latching mechanisms for securing an aircraft panel to an aircraft structure. In particular, the present disclosure relates to latches which disengage when a predetermined load is exceeded.

A disengageable latch, or blowout latch, disengages when the pressure against a panel, to which the blowout latch is mounted, exceeds a predetermined limit. Aircraft employ many types of latches including blowout latches to secure aircraft panels to adjacent aircraft structures. For example, blowout latches are used to secure panels enclosing an aircraft's engine. When used in such an environment, the blowout latch opens and relieves pressure which is built up inside the engine enclosing structure defined by the panels due, for example, to the jet exhaust stream flowing through the jet engine. The opening of the blowout latch allows the panels to pivot open and vent the excessive pressure thus preventing any damage due to excessive loads on the panels or other structural components.

A variety of such blowout latches are available which include devices which require a tool for opening or have a trigger for opening the latch. Additionally, latches are available which allow the handle to pivot outwardly thereby indicating that the latch has been disengaged by excessive loads or "blown".

One element that is relatively consistent in the blowout latch mechanisms is the use of a biasing mechanism to impose force upon a bolt of the latching mechanism. The biasing mechanism applies a force in relation to the spring force of the spring used in the mechanism. This retains the bolt in engagement against another structure such as the structural portion of the aircraft against which when the panel is closed. When a force which is greater than the biased load against the bolt occurs against an interior surface of the panel, the panel is blown. In other words, the bolt is retained against the blowout force until the blowout force is exceeded whereupon the biasing mechanism is compressed or otherwise exceeded thereby releasing the panel under the force exerted from within the enclosed area.

A problem arises when the latching mechanism must be disengaged in order to open the panel. For example, it is desirable to selectively disengage the panel for maintenance, inspection and other activities. In other words, prior art blowout latches are difficult to selectively disengage because the biasing load or force applied against the bolt must be overcome in order to disengage the latch. For example, if the spring loaded force on the latch is 150 pounds, at least 150 pounds of pressure must be applied to the handle to disengage the latch from the abutting structure. It can be difficult to disengage the handle when overcoming such forces. This situation can be exacerbated depending upon the strength and size of the person opening the panel.

As such it would be desirable to provide a latching mechanism which eliminates the need to overcome the biasing force used to retain the panel against blowout forces. According to the present disclosure, a pressure relief or blowout latch is provided for latching a first panel to a second panel. The latch is releasable under pressure when overcoming a biasing force of a biasing mechanism of the latch or by selective disengagement by bypassing the biasing mechanism with relatively little force. The latch includes a roller movable between an engaged position in contact with the second panel and a disengaged position spaced-away from the second panel. The latch further includes a shaft coupled to the roller for rotational movement with the roller about an axis along the shaft. A handle support of the latch is provided for rotational movement with the shaft and the roller. A bolt is coupled to the shaft and includes a channel for receiving at least a portion of the handle support. The handle support is rotatable relative to the bolt. The latch further includes a trigger and a biasing mechanism. The trigger includes a pin normally engaged with the bolt and the handle support and is selectively movable to release the pin from engagement with the handle support and the bolt. Release of the pin permits the handle support to move relative to the bolt to rotate the shaft and roller to move the roller to the disengaged position. The biasing mechanism is normally engaged with the bolt to prevent the bolt from rotating about the axis. The bolt is configured to disengage the biasing mechanism when internal pressure on the roller is translated to the bolt through the shaft, handle support, and pin.

The latch of the disclosure further includes a roller assembly rigidly coupled to the shaft for rotation therewith. The roller assembly includes a generally "L-shaped" arm having a first end coupled to the shaft and a second end coupled to the roller.

The latch further includes a second roller assembly.

The bolt of the latch includes an aperture and a portion of the shaft is received within the aperture for rotational movement of the shaft relative to the bolt. The bolt further includes a notch and a portion of the biasing mechanism is received within the notch. The biasing mechanism includes a pin received within the notch of the bolt, a slide coupled to the pin, a spring configured to bias the pin into engagement with the bolt, and an adjuster to adjust the compression of the spring. The adjuster as disclosed is a threaded screw.

The bolt further includes a ledge normally engaged with the pin of the trigger and the handle support includes a ledge normally engaged with the pin to position the pin between the handle support and the bolt.

The latch further includes a housing coupled to the first panel and a handle pivotally coupled to the housing. The trigger is pivotally coupled to the handle and includes a spring to bias a body of the trigger to an upright position where the pin of the trigger is engaged with the bolt and the handle support. Pivoting movement of the trigger against the spring of the trigger from the upright position to a depressed position disengages the pin from the handle support and the bolt to permit the handle to rotate relative to the housing. The handle support is pivotally coupled to the handle. Movement of the handle carries the handle support and urges the handle support to pivot about the axis to rotate the shaft to move the roller to the disengaged position.

The handle support as disclosed includes an aperture for receiving a portion of the shaft. The shaft includes an aperture generally perpendicular to the axis and the latch further includes a pin received within the shaft to rigidly couple the shaft to the handle support.

The blowout latch as disclosed includes structures which function to disengage the biasing force within the latch, thus, allowing the latch to be disengaged with relatively little force. The latch, even though disengaged, maintains the biasing load on the bolt even when the latch is selectively opened and disengaged from the corresponding aircraft structure. In use, the blowout latch as disclosed allows a person to activate the trigger disengaging the handle support, coupled to the releasable handle to disengage corresponding roller assemblies which are coupled to the handle support. When the handle and handle support are returned to a closed position the associated roller assembly can once again be engaged with the corresponding second panel. The bolt is not disengaged when the blowout latch is selectively opened. Instead, the bolt is retained in the loaded position with the biasing mechanism maintaining a load on the bolt. When excessive forces are exerted on an interior surface of the first panel to which the latch is attached, the biasing forces of the biasing mechanism are exceeded thereby causing the roller assembly to operate to move the bolt to disengage the handle causing disengagement of the first panel from the second panel.

Additional features of the disclosure will become apparent to those skilled in the art upon consideration of the following detailed description of an embodiment exemplifying a mode of carrying out the disclosure as presently perceived.

BRIEF DESCRIPTION OF THE DRAWINGS

The description below particularly refers to the accompanying figures in which:

FIGS. 4–6 illustrate the blowout latch moving from a closed, engaged position to an open, disengaged position by a user releasing a trigger of the blowout latch to bypass a biasing mechanism of the latch to permit the door panel to which the latch is attached to be opened;

FIGS. 7–9 illustrate the blowout latch moving from a closed, engaged position to a blowout or disengaged position due to sufficient internal forces acting on an interior surface of the door panel and the latch to overcome biasing forces of the biasing mechanism to cause the roller assembly of the latch to rotate away from the cowl panel so that the door panel may be blown out with respect to the adjacent cowl panel;

DETAILED DESCRIPTION

While the present disclosure may be susceptible to embodiment in different forms, there is shown in the drawings, and herein will be described in detail, at least one embodiment with the understanding that the present description is to be considered an exemplification of the principles of the disclosure and is not intended to limit the disclosure to the details of construction and the arrangements of components set forth in the following description or illustrated in the drawings.

Figure 1:
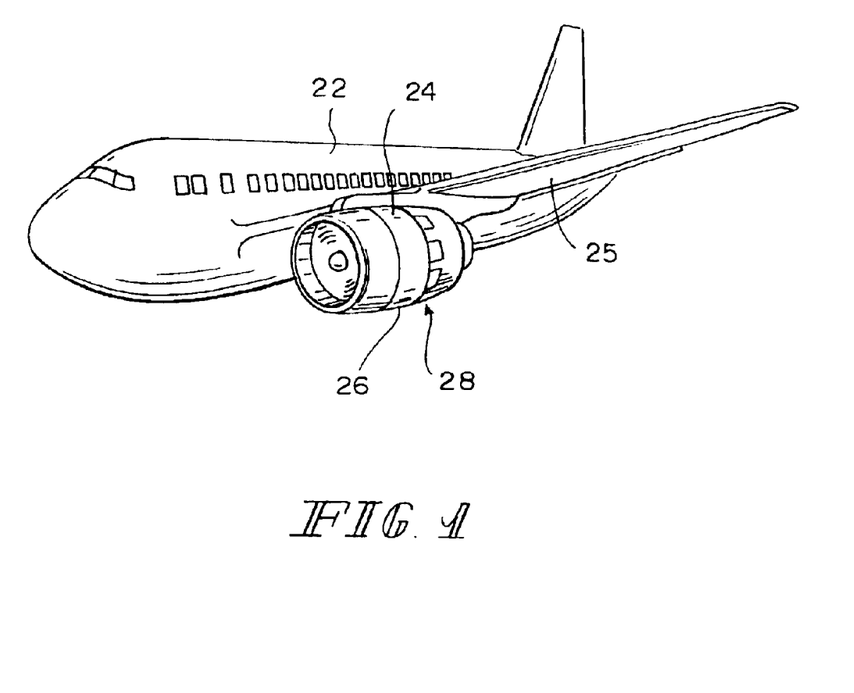
FIG. 1 is a perspective view of an aircraft illustrating one application of a blowout latch on such an aircraft.

A blowout latch 20 (see FIG. 2) is employed to retain a door panel 120 to a corresponding structure, such as a cowl panel 123. As shown in FIG. 1, an aircraft 22 includes an engine 24 mounted on a wing 25 and having several access doors 28 in the cowl 26 of the engine 24. In the present description set forth herein, reference is made to a variety of components which may be shown and described in greater detail in corresponding U.S. patent application Ser. No. 08/685,482 filed Oct. 10, 2000 including at least one inventor of the present disclosure and assigned to the assignee of the present application. This prior application is incorporated herein by reference to provide support for any additional structures or functions relating to the present disclosure.

Figure 2:
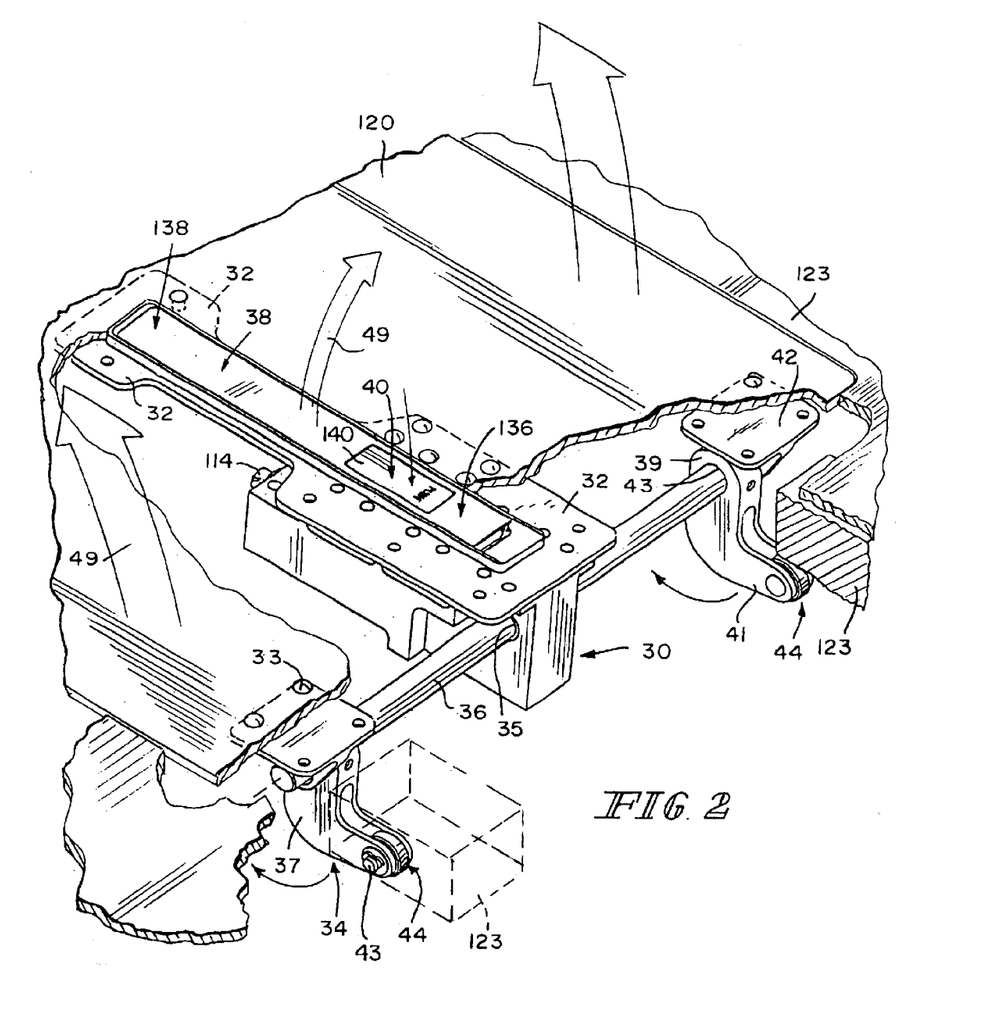
FIG. 2 is a perspective view of the blowout latch of the present disclosure showing the latch coupled to an access door panel of the aircraft (shown with portions broken away) and further showing roller assemblies of the latch engaged with a portion of a cowl panel of the aircraft adjacent the door panel.
Figures 4, 5, 6:
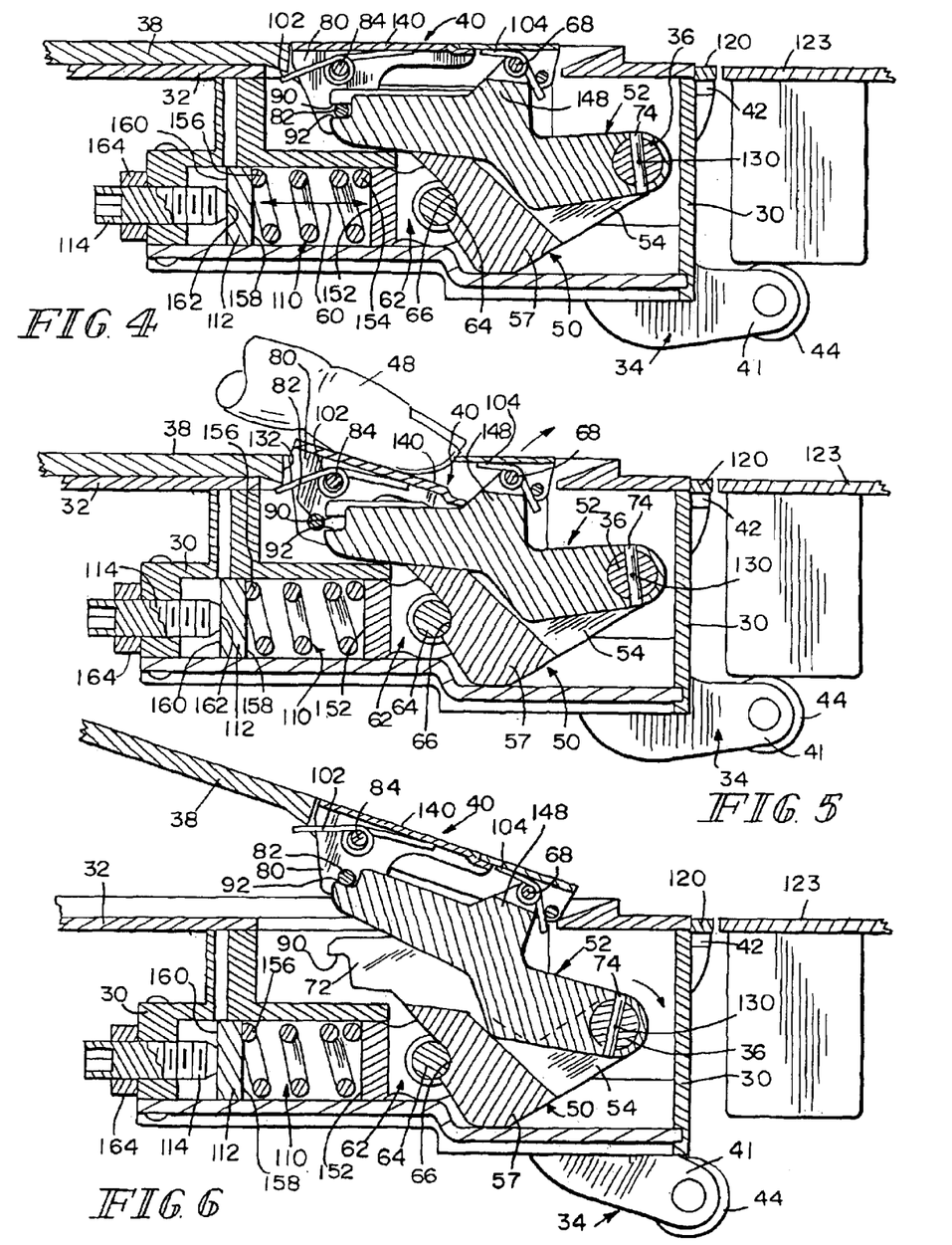
FIG. 4 is a sectional view showing the blowout latch in the closed, engaged position and showing one of the roller assemblies of the latch engaged with a portion of the cowl panel of the aircraft adjacent the door panel.
FIG. 5 is a sectional view similar to FIG. 4 showing a user depressing the trigger to bypass the biasing mechanism and manually release the latch.
FIG. 6 is a sectional view similar to FIGS. 4 and 5 showing the disengaged trigger having caused the roller assembly to rotate in a generally clockwise direction to become disengaged from the cowl panel to permit the door panel to be opened and moved relative to the cowl panel.
Figures 7, 8:
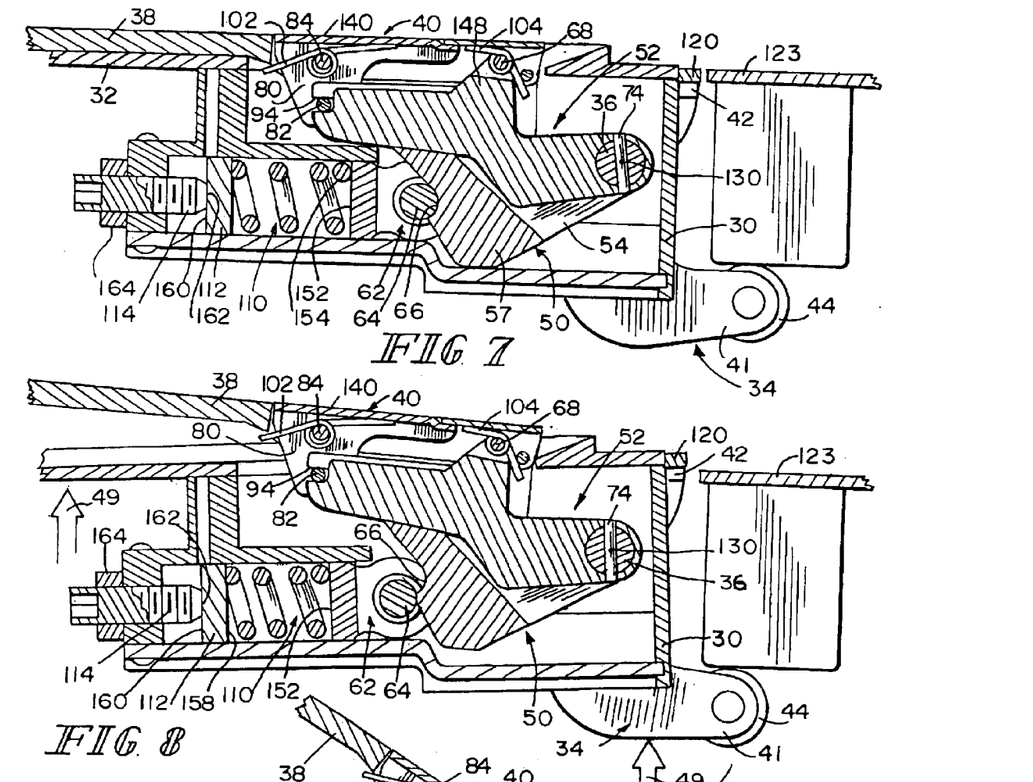
FIG. 7 is a sectional view similar to FIG. 4 showing the latch in the closed, engaged position.
FIG. 8 is a sectional view similar to FIG. 7 showing internal forces acting on the latch (and the door panel to which the latch is attached) to cause the roller assembly to rotate in a generally clockwise direction and cam along a bottom portion of the cowl panel.

As stated above, blowout latch 20 is provided to retain door panel 120 in a closed position, as shown in FIGS. 2, 4, and 7, with respect to the adjacent cowl panel 123. Latch 20 is manually moveable by a user between a normally closed or engaged position engaged with cowl panel 123 and an open or disengaged position disengaged from cowl panel 123 to open panel 120 in a direction away from aircraft 22, as shown in FIGS. 4–6 and discussed in greater detail below.

Figure 9:
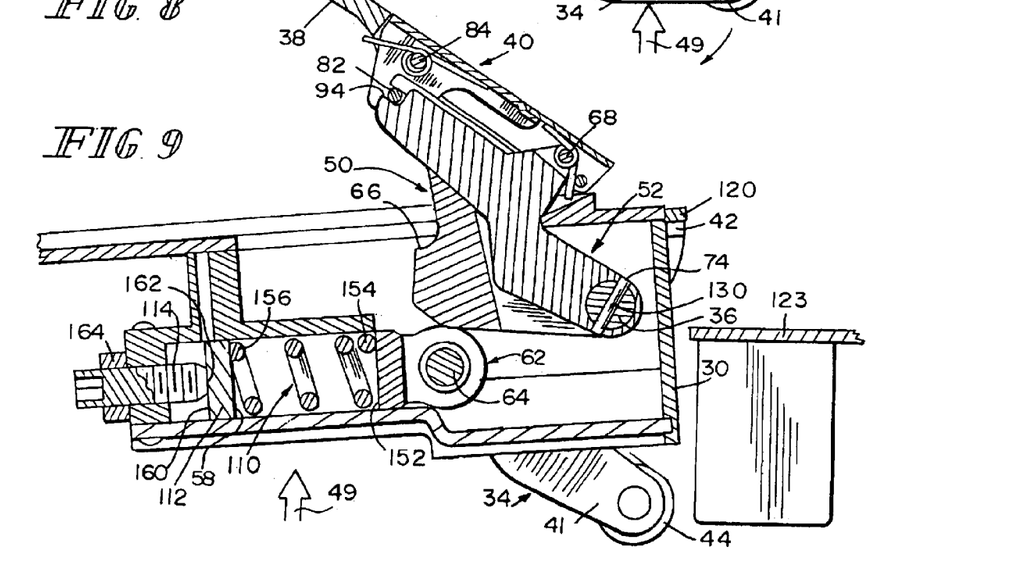
FIG. 9 is a sectional view similar to FIGS. 7 and 8 showing the roller assembly having disengaged the cowl panel due to internal forces greater than the biasing forces of the biasing mechanism to permit the door panel to be moved relative to the cowl panel.
Figure 10:
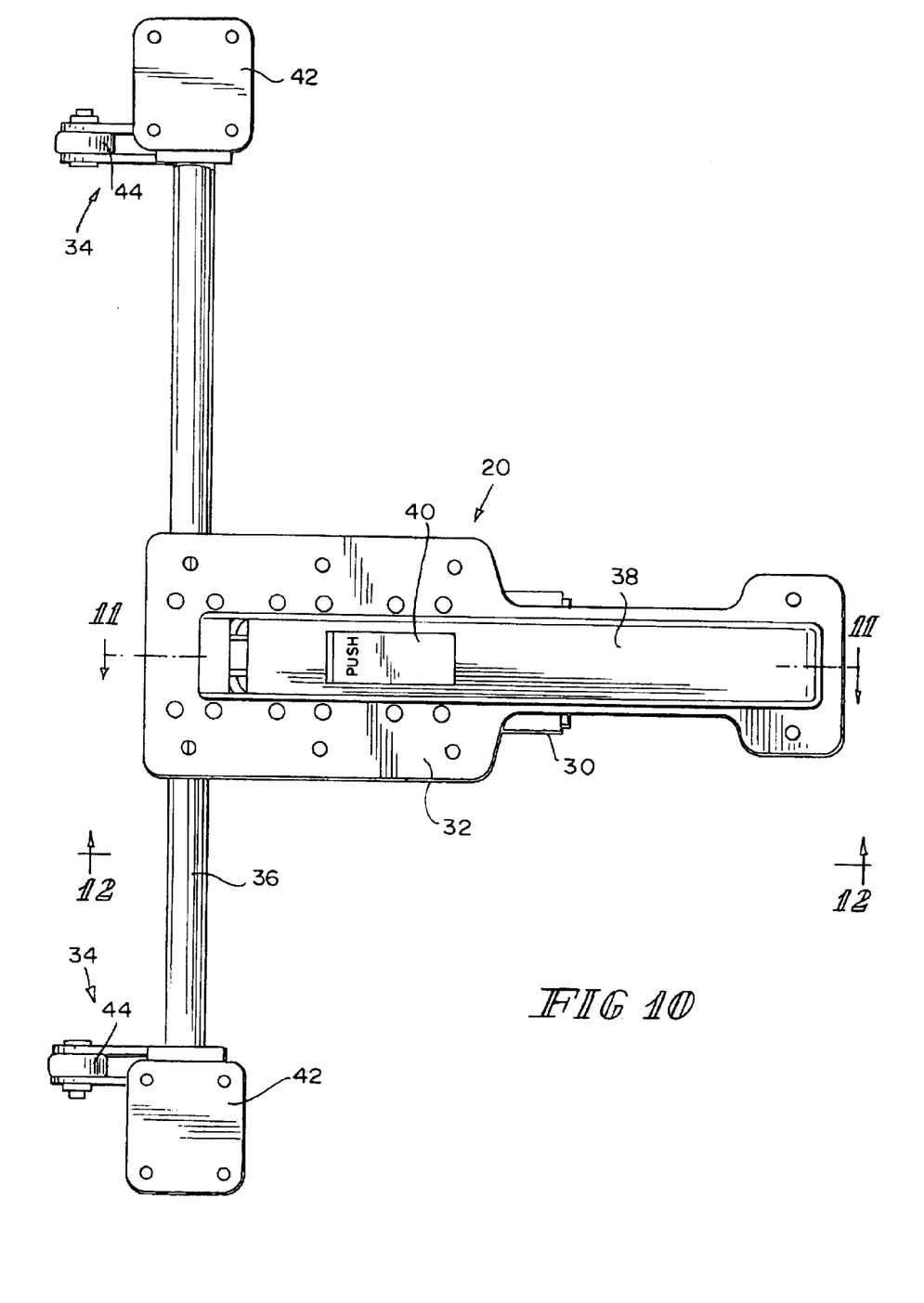
FIG. 10 is a top plan view of the blowout latch.
Figure 11:
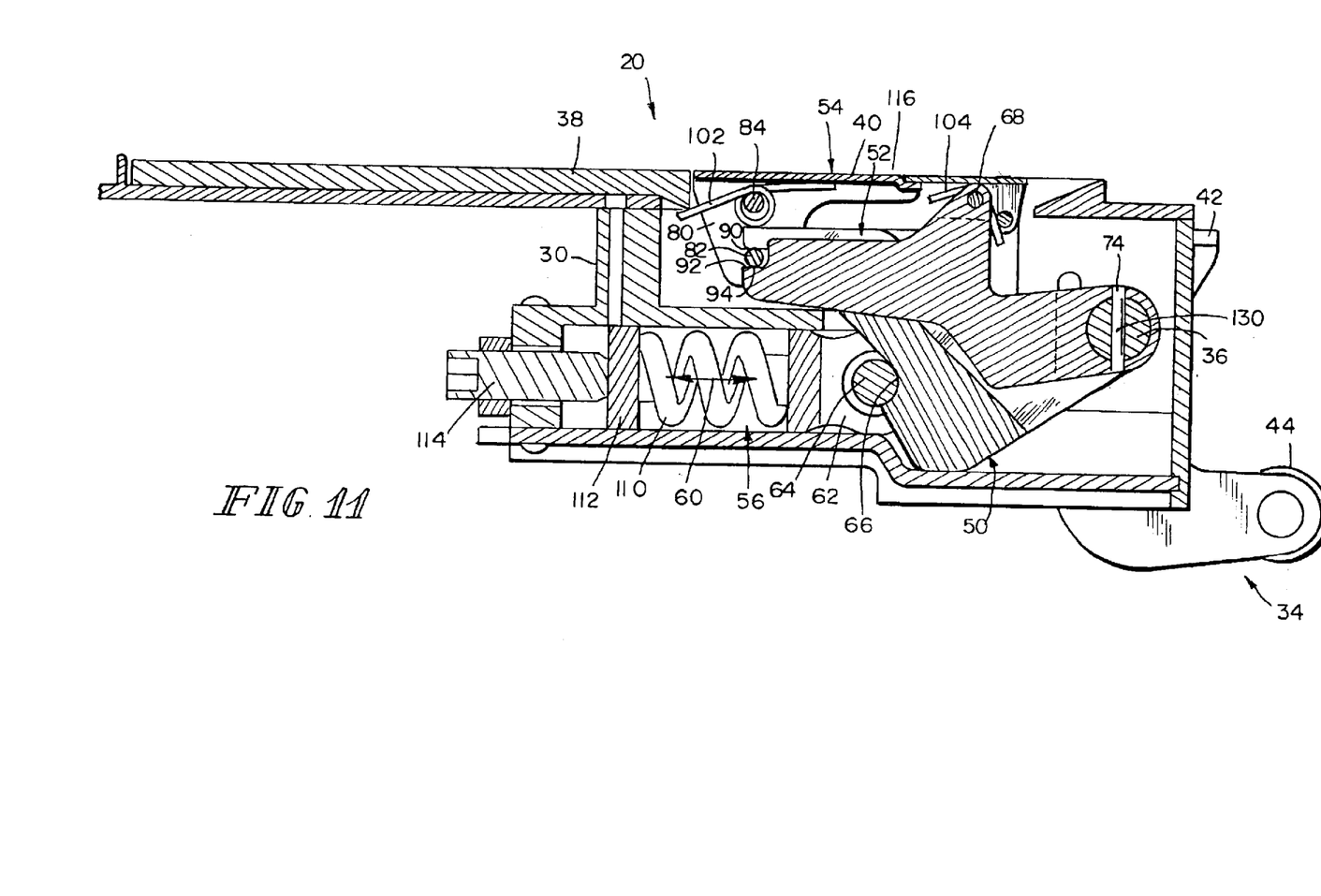
FIG. 11 is a partial fragmentary cross-sectional side elevational view of the latch taken along line 11—11 in FIG. 10.

Further, latch 20 is movable between the normally closed position and a blowout or disengaged position due to internal forces acting on latch 20 and panel 120 which overcome a biasing force which normally causes latch 20 to engage cowl panel 123, as shown in FIGS. 7–9 and discussed in greater detail below. The force required for the user to move latch 20 to the open position (disengaged from cowl panel 123) is much smaller than the biasing force required to move latch 20 from the closed position to the blowout position (disengaged from cowl panel 123). In other words, operation of a trigger 40 by a user 48 to manually disengage latch 20 from cowl panel 123 bypasses the biasing force normally maintaining latch 20 in engagement with cowl panel 123. During manual disengagement of latch 20, as shown in FIGS. 4–6, the biasing load from the biasing force is maintained.

With reference to FIG. 2, the latch 20 includes a housing 30, a flange 32 attached to the housing 30, and outwardly extending roller assemblies 34. The roller assemblies 34 are mounted on a shaft 36 extending through an aperture 35 of the housing 30 and cooperatively engaged with the mechanisms retained within the housing 30 as is described in greater detail below. As shown in FIG. 2, latch 20 includes two roller assemblies 34. This is in contrast to prior latching mechanisms which may have required two separate latching mechanisms to perform the function as disclosed. Latch 20 further includes a releaseable handle 38 and the trigger 40 cooperatively arranged and retained on the flange 32.

Figure 3:
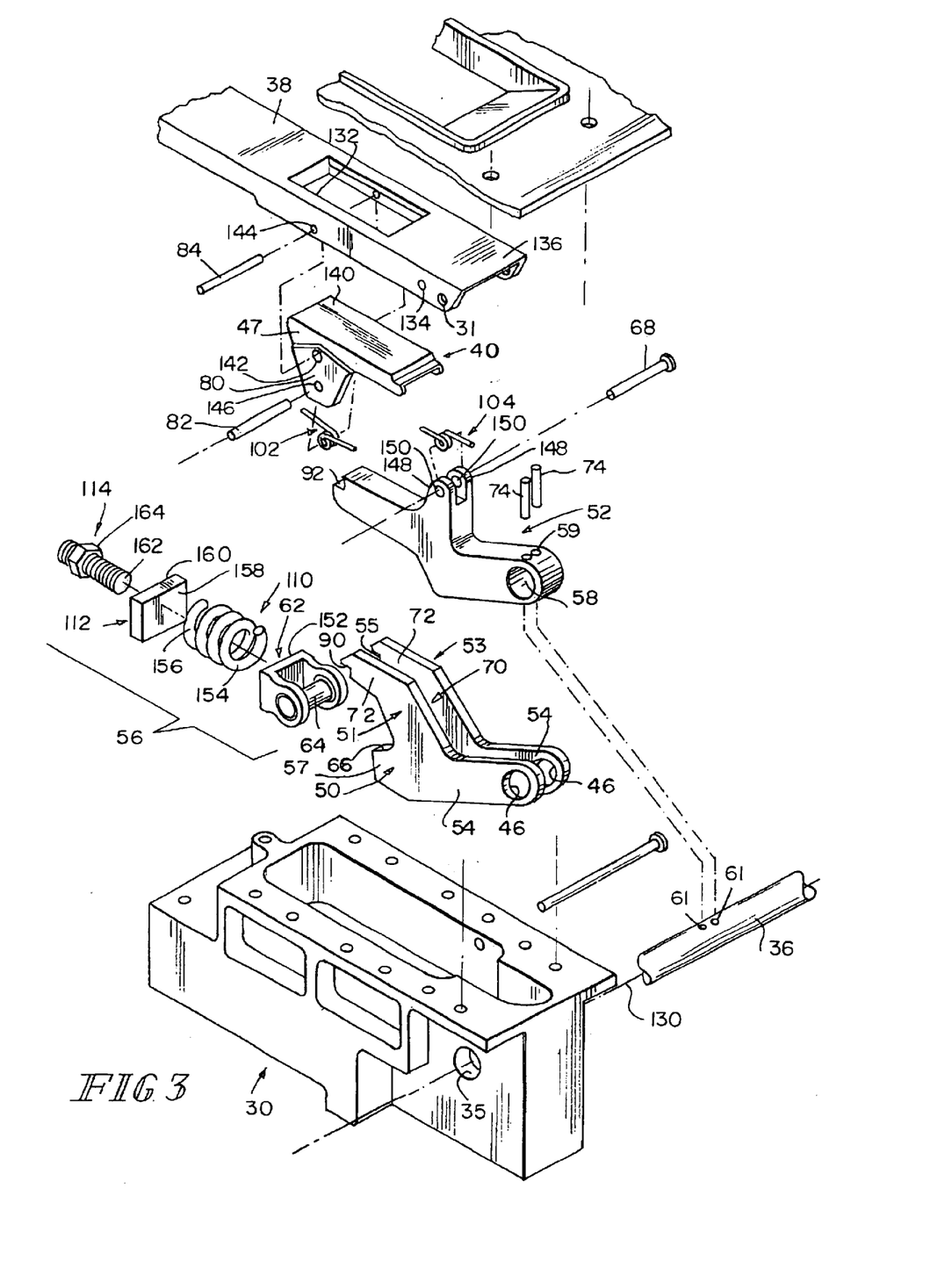
FIG. 3 is an exploded perspective view of a portion of the blowout latch showing a housing of the latch and various components of the blowout latch normally contained within the housing.

Looking now to FIG. 3, handle 38 defines an aperture 132 for receiving a portion of trigger 40 therein. Handle 38 is pivotally coupled to a handle support 52 by a rivet 68 received through apertures 134 located at a first end 136 of handle 38. A second end 138 of handle 38 is shown in FIG. 2. As is described below, handle 38 pivots about rivet 68 relative to housing 30 when trigger 40 is engaged by a user.

Figure 20:
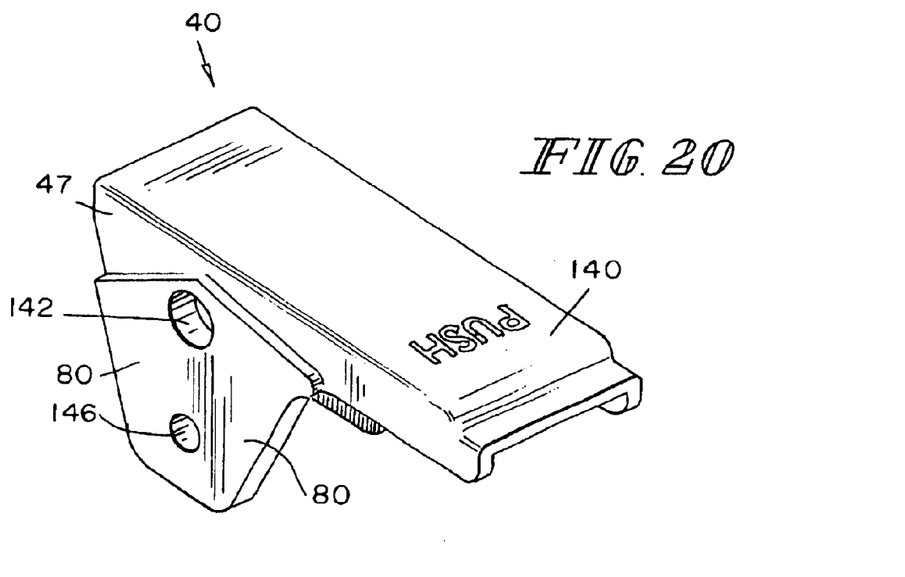
FIG. 20 is a perspective view of the trigger of the latch of the present disclosure.

Trigger 40 includes a body 47 having a top surface 140 visible through aperture 132 of handle 38. Trigger 40 further includes a first aperture 142 for receiving pin 84. Pin 84 is also received within apertures 144 of handle 38 so that trigger 40 is pivotally coupled to handle 38 at pin 84. A second aperture 146 of trigger 40 receives a locking pin 82. Trigger 40 further includes a trigger spring 102 which also receives a portion of pin 84. Trigger spring 102 biases trigger 40 to its normally upright position, as shown in FIGS. 2, 4, and 7. With reference to FIGS. 4 and 20, the trigger 40 includes a pair of opposed arms 80. Locking pin 82 extends through each of the arms 80 and is used to engage both a bolt 50 and a handle support 52 of latch 20 as is described in greater detail below. Pin or axle 84 extends through the spaced apart arms 80 at a distance offset from the locking pin 82 to pivotally attach the trigger 40 to the handle 38.

The handle 38 of latch 20 is retained against casual or accidental disengagement by engagement of the pin 82 between the handle support 52 and the bolt 50. With reference to FIGS. 4–10, the bolt 50 includes a downwardly-facing pin-receiving ledge 90 and the handle support 52 includes a corresponding upwardly-facing pin-receiving ledge 92. The pin-receiving ledges 90, 92 define a notch 94 therebetween which is sized and dimensioned to receive the pin 82 therein. Pin 82 prevents movement of the bolt 50 and handle support 52 relative to each other.

The flange 32 of the assembly 20 and corresponding mounting portions 42 of the roller assemblies 34 are mounted to the door panel 120 which is normally closed, as shown in FIGS. 2, 4, and 7. Flange 32 and mounting portions 42 are illustratively mounted to door panel 120 by rivets 33. However, it is within the scope of this disclosure to mount flange 32 and mounting portions 42 to panel 120 with other suitable fasteners such as screws, pins, bolts, or the like.

Each roller assembly 34 includes an "L-shaped" arm 37 having a first end portion 39 coupled to a respective mounting portion 42 and a second end portion 41. First end portion 39 includes an aperture 43 for receiving a portion of shaft 36 therethrough. The roller assemblies 34 rotate with shaft 36 about an axis 130 along shaft 36. Each roller assembly 34 further includes a roller 44 coupled to second end portion 41 by a bolt 45 or the like. Roller 44 of each roller assembly 34 normally abuts, or latches onto, a portion of a cowl panel 123, as shown in FIGS. 2, 4, and 7, of the corresponding air frame to retain the door panel 120 in the closed position. As such, the latch 20 in its entirety is coupled to the displaceable panel 120 of the aircraft 22 and panel 120 is held closed when each roller 44 is engaged with the portion of cowl panel 123. It should be understood that such a latching mechanism may also be used in structures other than an aircraft.

As shown in FIG. 3, the latch 20 includes various components generally retained within housing 30. Latch 20 includes bolt 50, handle support 52, and a biasing mechanism 56. All of these components operate to provide the desired function as disclosed.

Figure 16:
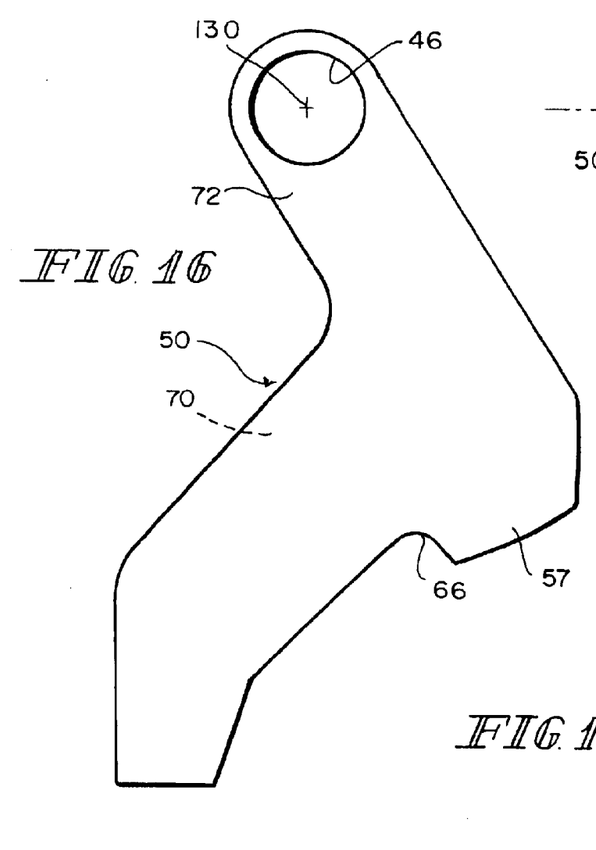
FIG. 16 is an enlarged side elevational view of a bolt of the latch of the present disclosure.
Figure 17:
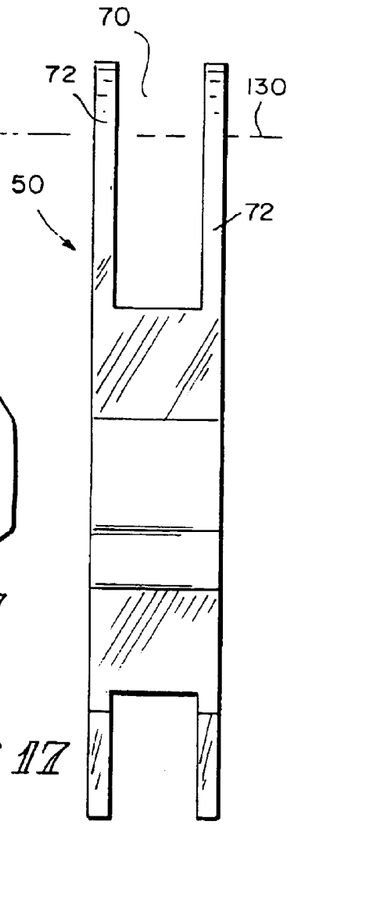
FIG. 17 is a bottom view of the bolt shown in FIG. 16.
Figure 18:
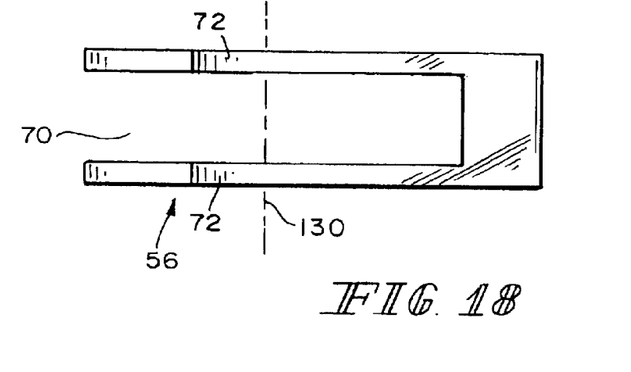
FIG. 18 is a top plan view of the bolt shown in FIGS. 16 and 17.
Figure 19:
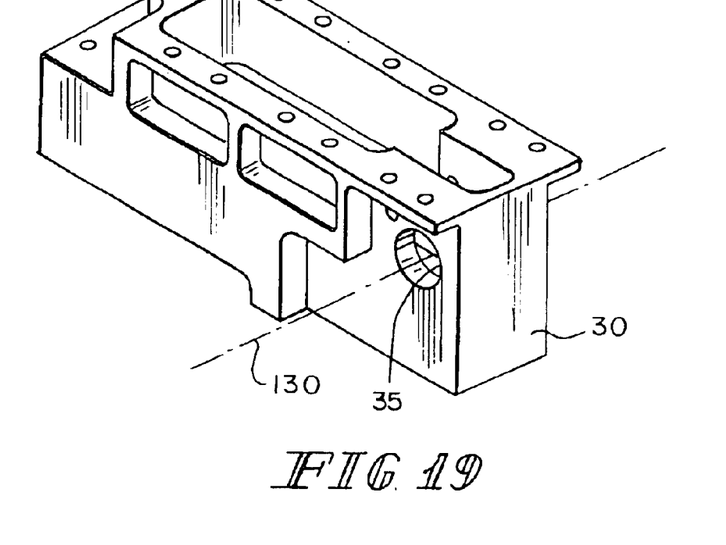
FIG. 19 is a perspective view of the housing of the latch of the present disclosure.

The bolt 50, as shown in FIGS. 3 and 16–18, includes first and second panels 51, 53 defining a channel 70 therebetween. Each panel 51, 53 includes an arm portion 72 extending generally upwardly from a foot portion 54. Each arm portion 72 defines pin-receiving ledge 90 and each foot portion 54 defines an aperture 46 for receiving a portion of shaft 36 therethrough. Pin-receiving ledge 90 abuts pin 82 of trigger 40 in the normally closed position as shown in FIGS. 4 and 7. Panels 51, 53 are coupled together, as shown in FIGS. 16 and 17 by an end portion 57 defining a notch 66. Notch 66 normally engages a portion of biasing mechanism 56 to prevent movement of bolt 50 relative to housing 30. The manner in which bolt 50 interacts with the biasing mechanism 56 and other components of latch 20 is described in greater detail below.

As shown in FIGS. 3 and 13–15, the handle support 52 includes an aperture 58 for receiving a portion of the shaft 36 therethrough. Handle support 52 further includes apertures 59 along an axis perpendicular to that of an axis through aperture 58. Apertures 59 receive pins 74 therethrough. Pins 74 are also received through corresponding apertures 61 formed through shaft 36 so that shaft 36 is keyed to handle support 52. Therefore, shaft 36, handle support 52, and roller assemblies 34 all rotate together about axis 130. Movement of handle support 52 about axis 130 moves latch 20 from the engaged position to the disengaged position.

Handle support 52 further includes pin-receiving ledge 92 for engaging locking pin 82 of trigger 40. A handle spring 104 of handle support 52 is positioned between upwardly extending flanges 148 of handle support 52. Each flange 148 forms an aperture 150 for receiving a portion of a pivot pin 68 therethrough. Pin 68 is also received through handle spring 104. The handle support 52 is also pivotally retained by a pivot pin 68 to the handle 38. As shown in FIGS. 4–9, a portion of handle support 52 is received within channel 70 of bolt 50. Handle spring 104 urges releaseable handle 38 to pivot about rivet 68 and carry handle support 52, attached by rivet 68, upwardly therewith. However, as shown in FIGS. 4 and 7, locking pin 82 and bolt 50 prevent handle support 52 from moving which therefore prevents handle 38 from pivoting about rivet 68 relative to housing 30.

Biasing mechanism 56 includes a slide 62, a biasing member or spring 110, a guide 112, and an adjustment mechanism or adjuster in the form a threaded tensioning screw 114, as shown in FIG. 3. Biasing mechanism also includes pin 64 coupled to slide 62 and normally biased to engage notch 66 of bolt 50. Slide 62 includes a generally vertical, flat face 152 engaged with a first end 154 of spring 110. A second end 156 of spring 110 engages a first surface 158 of guide 112 while a second surface 160 of guide 112 engages end 162 of threaded screw 114. A nut 164 is threaded onto screw 114. Biasing mechanism 56 provides a pre-set biasing force 60 adjustable by screw 114, for preventing latch 20 (and panel 120) from being blown out due to internal forces smaller than the biasing force. However, internal forces greater than the biasing force 60 provided by biasing mechanism 56 will cause the latch 20 and panel 120 to blow out. Biasing mechanism 56, and specifically pin 64 biased to engage and be held within notch 66, prevents bolt 50 from rotating about axis 130 unless the biasing force 60 is overcome by internal forces to cause pin 64 to become disengaged from bolt 50. Biasing mechanism 56 effectively retains bolt 50 in a loaded position.

The biasing mechanism 56 as noted above includes a biasing member 110 illustrated herein as a coil spring. The coil spring can be embodied in many different forms and one skilled in the art will be able to provide substitutes to the coil spring which provide the same or a similar function. The coil spring is retained between the slide 62 and a guide 112. Screw 114 operates against the guide 112 to adjust the biasing force 60 exerted by the mechanism 56 on the bolt 50.

The shaft 36 to which the roller assemblies 34 are attached extends through apertures 35 of housing 30 and is operatively connected to the handle support 52. As mentioned above, shaft 36 is received through apertures 46 of bolt 50 and through aperture 58 of handle support 52. Further, handle support 52 is keyed to shaft 36 via pins 74 so that handle support 52 and shaft 36 rotate together about axis 130. Bolt 52 and shaft 36, however, are rotatable about axis 130 independent of each other.

In the engaged position as shown in FIGS. 4 and 7, the biasing mechanism 56 provides biasing force 60 applied to slide 62 to impose the force 60 on the bolt 50 to prevent loaded bolt 50 from moving relative to housing 30. The handle support 52 is retained in a generally fixed position due to locking pin 82. Disengagement of the pin 82 by operation of the trigger 40 by a user 48 and subsequent movement of the handle 38 about pivot point or rivet 68 causes the handle support 52 move with handle 38 due to the coupled connection at pin 68 thus causing handle support 52 to rotate about axis 130 with shaft 36. Rotation of shaft 36 causes the roller assemblies 34 to rotate clockwise about axis of rotation 130 of the shaft 36. As noted above, the roller assemblies 34 are retained in a fixed position on the shaft 36. As such, rotation of the shaft 36 causes rotation of the roller assembly 34.

Figure 12:
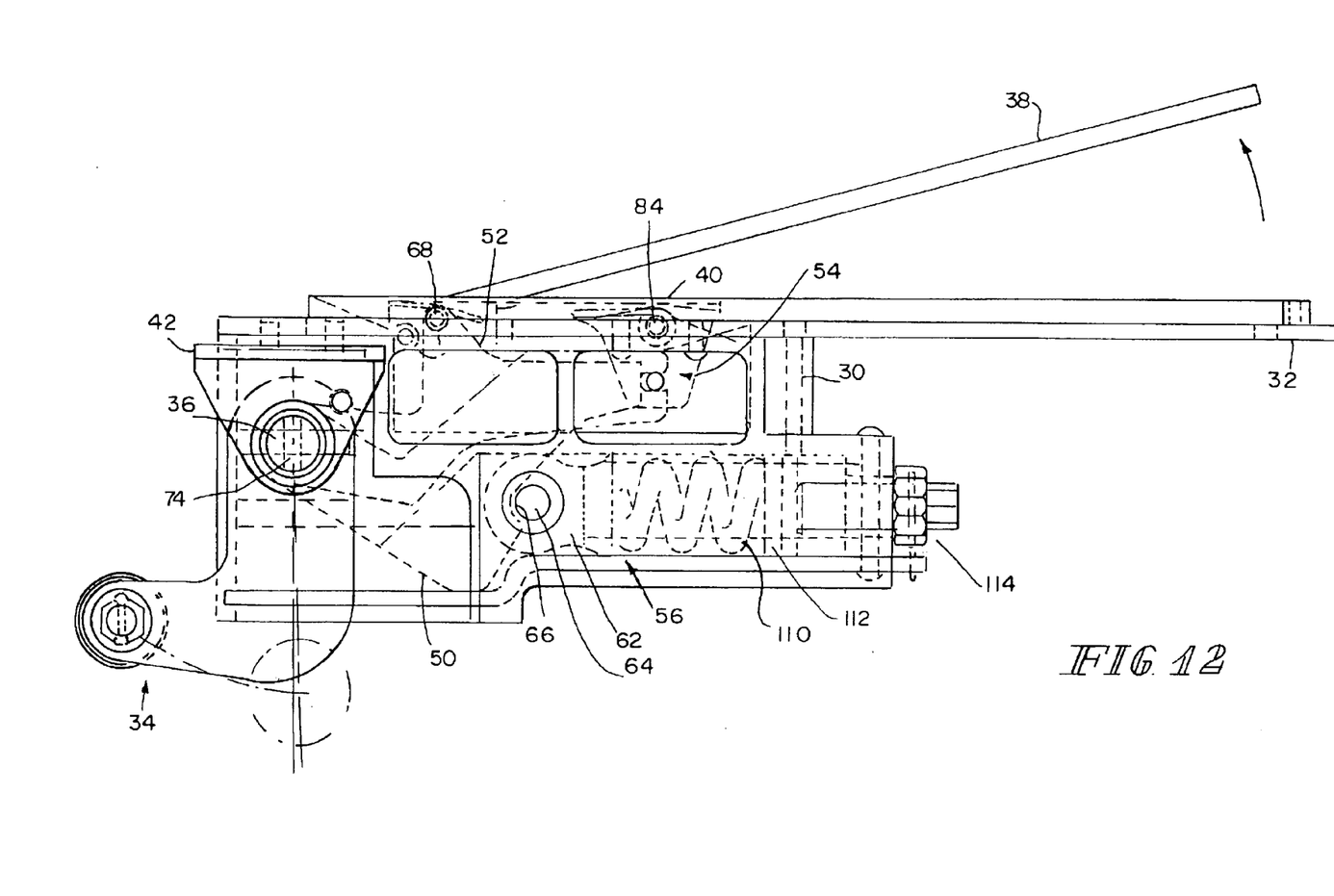
FIG. 12 is a side elevational view taken along line 12—12 in FIG. 10.
Figure 13:
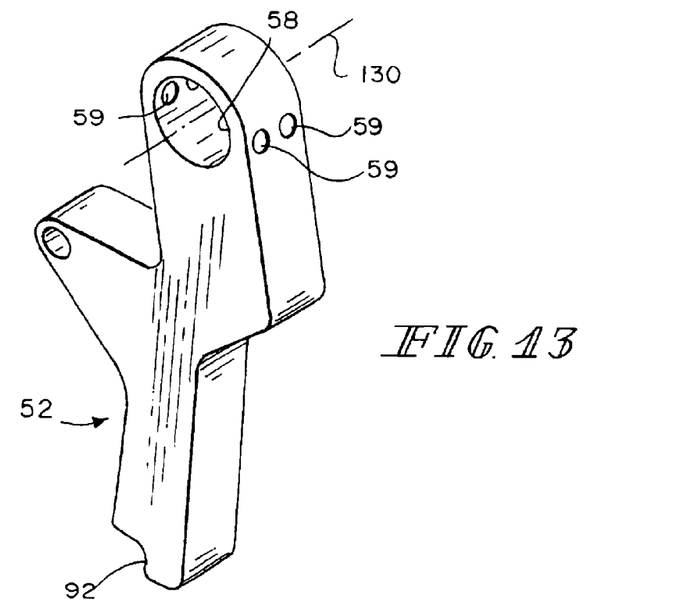
FIG. 13 is an enlarged perspective view of a handle support of the latch of the present disclosure.
Figure 14:
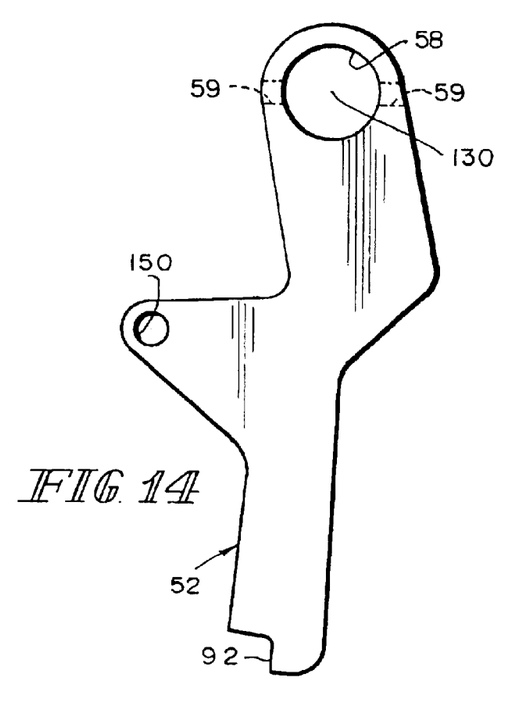
FIG. 14 is an enlarged side elevational view of the handle support shown in FIG. 13.
Figure 15:
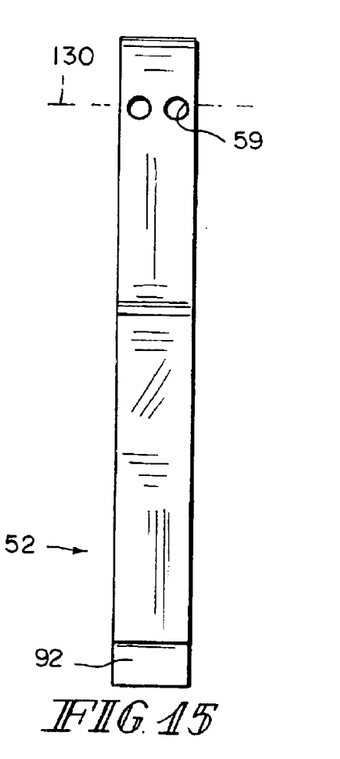
FIG. 15 is an enlarged bottom view of the handle support shown in FIGS. 13 and 14.

It should be noted that the trigger 40 is generally retained in an upright position by operation of the trigger spring 102. As such, when trigger 40 is depressed by user 48, as shown in FIG. 5, the spring 102 is compressed thereby providing a return force when the trigger 40 is released. In a similar manner, handle spring 104 is provided on the handle 38 causing the handle 38 to rise after the trigger 40 disengages the pin 82 from the notch 94. The opened or sprung condition of handle 38 is shown in FIGS. 6 and 12.

In operation, as mentioned above, latch 20 is provided to retain door panel 120 in a closed position. Door panel 120 is adjacent cowl panel 123 and roller assemblies 34 of latch 20 engage or hook onto a portion of cowl panel 123 to maintain door panel 120 in the closed position. In the closed or engaged position, as shown in FIGS. 4 and 7, locking pin 82 of trigger 40 is engaged with and positioned in notch 94 between bolt 50 and handle support 52. Specifically, locking pin 82 engages pin-receiving ledge 90 of bolt 50 and pin-receiving ledge 92 of handle support 52. Locking pin 82, therefore, operates to normally prevent movement between bolt 50 and handle support 52. Handle 38 is urged to rotate about rivet 68 relative to housing 30. However, handle 38 is normally prevented from pivoting about rivet 68 due to the fact that pin 82 bears against 90 and pin 64 is bearing against notch 66 to prevent movement.

To manually operate latch 20, and bypass biasing force 60, so that panel 120 may be opened, user 48 depresses trigger 40 by pressing in a generally downwardly direction on top surface 140 of trigger 40. This causes trigger 40 to pivot in a clockwise direction about pin 84, thus disengaging locking pin 82 from notch 94 of bolt 50 and handle support 52, as shown in FIG. 5.

Disengaging the roller assemblies 34 by manually operating the trigger 54 and handle 38 can be achieved with little force. As noted above, prior devices required overcoming the entire biasing force 60 created by the biasing assembly 56. However, the latch 20 as disclosed merely requires operation of the trigger 54 to disengage the pin 82 from the bolt 50 and handle support 52. Once the pin 82 is disengaged from the notch 94 the handle 38 is pivoted about rivet 68 away from the housing 30 by operation of the spring handle 104. The trigger spring 102 returns the trigger 54 to the closed position.

Once the pin 82 is disengaged from the bolt 50 and the handle support 52, the handle support, 52 is urged to rotate about the axis of rotation 130 by pivoting movement of handle 38 about rivet 68. Because the handle support 52 is keyed by pin 74 to the shaft 36, rotation of the handle support 52 also causes rotation of the shaft 36. Because the handle support 52 is positioned in the channel 70 of the bolt 50 the handle support 52 moves relative to the bolt 50 without the need to move the bolt 50 against biasing force 60. Independent operation of the handle support 52, which is normally nested or retained within a portion of the bolt 50, allows the bolt 50 to remain in the loaded position by the biasing assembly 56, as shown in FIG. 6. This independent operation of the handle support 52 and bolt 50 eliminates the need to overcome the spring force 60 when selectively disengaging the latch 20. As such, the disclosed latch 20 allows the selective disengagement and re-engagement of the roller assemblies 34 with a corresponding structure. The disclosed latch 20 also eliminates the need to overcome the force 60 imposed by the biasing mechanism 50 on the bolt 56 whenever the latch 20 is to be selectively disengaged or re-engaged.

In the closed, engaged or manually opened and disengaged position, not the blown out position, the biasing mechanism 56 maintains the biasing force 60 on the bolt 50. This retains the bolt 50 in the loaded position. When the pressure on the panel 120 to which the latch 20 is attached exceeds the relative biasing force 60 on the bolt 50 the latch 20 will be in a "blown" condition. Discussion of the disengagement of the latch is described in greater detail below.

When the latch 20 is subjected to pressure or forces 49 exceeding the desired blowout or biasing force 60, such forces exerted upon the panel 120 impose or otherwise induce forces on the roller assemblies 34 (See FIGS. 7–9).

The rollers 44 of the roller assembly 34 are rotatable and as such provide a degree of rolling movement relative to the cowl pane 123 to which the latch 20 is coupled. As the forces 49 build against the panel 120, the forces 49 are translated to the roller assembly 34 thereby inducing torsion or torque on the shaft 36. The torque is translated to the handle support 52 as a result of the handle support being keyed by pin 74 to the shaft 36. The shaft 36 is designed to resist forces substantially greater than the blowout force or biasing force 60 associated with the latch 20 so that there is no failure at the shaft 36.

Continued application of force 49 against the panel 120 results in forces being translated from the shaft 36 to the handle support 52 and to the pin 82. As noted above, the pin 82 is retained in the notch 94 between the handle support 52 and bolt 50. There is a generally clockwise, upward rotational force of the handle support 52 on the pin 82 about the axis of rotation 130. The rotational force induces an upward force on the corresponding portion of the bolt 50. As the force on the panel 120 and roller assemblies 34 continues to build, the forces at the pin 82 result in a rotational force of the bolt 50 about the axis of rotation 130. Rotational movement about the axis of rotation 130 causes the surfaces of the bolt 50 defining the notch 66 to operate against the pin 64 of biasing mechanism 56. Transfer of forces to the pin 64 results in compressing the spring 110. When the forces on the bolt 50 exceed the biasing force 60 of the biasing mechanism 56 the pin 64 disengages from the notch 66. During these disengaging processes, the handle support 52 becomes movable because the resistance provided by the once loaded bolt are gone. Because the trigger 40 is still engaged and handle support 52 is pushing upward, the handle 38, 50, 52 locate together around shaft 130. As handle support 52 is carried on handle 38, handle support 52 pivots about axis 130 causing shaft and roller assemblies 34 to freely move away from the corresponding structure 123 thereby allowing displacement of the panel 120 relative to the corresponding structure 123.

In summary, the latch 20 may be manually disengaged by depressing the trigger 40 to disengage the pin 82 from the bolt 50 and handle support 52. When depressed, the trigger 40 rotates about the pin 84 causing the locking pin 82 to rotate clockwise about the pin 84. Disengagement of the pin 82 frees the handle support 52 and handle 38 thereby allowing rotation of the structures relative to the axis of rotation 130 of the shaft 36. Because the handle support 52 is attached to or otherwise keyed to the shaft 36, displacement of the handle 38 and handle support 52 causes rotation of the shaft 36 and thereby disengages the roller assemblies 34 from the corresponding structure. Disengagement of the latch 20 from the corresponding structure, cowl panel 123, allows the panel 120 to which the latch 20 is attached to be disengaged from the corresponding structure.

Under the pressure actuated opening conditions, excessive pressure or forces 49 on an interior surface of the panel causes the panel to bear against the roller assemblies 34. This force creates a torque on the shaft 36 which is keyed to the handle support 52. The handle support is prevented from rotation under these conditions by the pin 82 which is retained between the handle support 52 and the bolt 50. As a result, rotational forces at the pin 82 about the axis of rotation 130 tend to lift upwardly on the corresponding portion of the bolt 50 which is in contact with the trigger pin 82. Continued exertion of force at the roller assemblies 34 cause torque in the shaft 36 and rotational forces at the pin 82 resulting in the bolt 50 acting against biasing mechanism 56 and causing the latch 20 to disengage once the forces exceed the biasing force 60 of the biasing mechanism 56 on the bolt 50. When the bolt 50 is sufficiently moved to sufficiently compress the spring 110 of the biasing mechanism 56 the pin 64 will disengage the notch 66 thereby eliminating the biasing forces which otherwise would hold the latch assembly 20 in a closed position.

While a preferred embodiment of the disclosure is shown and described, it is envisioned that those skilled in the art may devise various modifications and equivalents without departing from the spirit and scope of the disclosure as presented in this application.

What is claimed is:

1. A pressure relief latch for latching a first panel to a second panel and provided to release under pressure or by selective disengagement, the latch comprising:
   a housing;
   a roller movable between an engaged position in contact with the second panel and a disengaged position removed from contact with the second panel;
   a shaft coupled to the roller for rotational movement with the roller about an axis along the shaft;
   a handle;
   a handle support coupled to the handle, coupled to the housing, and coupled to the shaft for rotational movement with the shaft;
   a bolt coupled to the shaft and including a channel for receiving at least a portion of the handle support, the handle support being rotatable relative to the bolt;
   a trigger operatively associated with the handle, the trigger including a pin normally engaged with the bolt and the handle support, the trigger being movable to release the pin from engagement with the handle support and the bolt to permit the handle support to move relative to the bolt to rotate the shaft and roller to move the roller to the disengaged position; and
   a biasing mechanism normally applying a force to the bolt to prevent the bolt from rotating about the axis, the bolt being configured to disengage the biasing mechanism when internal force on the roller is translated to the bolt through the shaft, handle support, and pin.

2. The latch of claim 1, further including a roller assembly rigidly coupled to the shaft for rotation therewith including a generally "L-shaped" arm having a first end coupled to the shaft and a second end coupled to the roller configured to normally engage the second panel.

3. The latch of claim 2, further including a second roller assembly spaced from the first roller, the second roller being configured to normally engage the second panel and coupled to the shaft for rotational movement with the shaft about the axis.

4. The latch of claim 1, wherein the bolt includes an aperture and a portion of the shaft is received within the aperture for rotational movement of the shaft relative to the bolt, and wherein the bolt further includes a notch and a portion of the biasing mechanism is received within the notch.

5. The latch of claim 4, wherein the biasing mechanism includes a pin normally received within the notch of the bolt.

6. The latch of claim 5, wherein the biasing mechanism further includes a slide coupled to the pin, a spring configured to bias the pin into engagement with the bolt, and an adjuster to adjust the compression of the spring.

7. The latch of claim 4, wherein the bolt further includes a ledge normally engaged with the pin of the trigger and the handle support includes a ledge normally engaged with the pin to position the pin between the handle support and the bolt.

8. The latch of claim 1, wherein the biasing mechanism includes a slide having a pin engaged with a portion of the bolt, a spring biasing the pin into engagement with the bolt, and an adjuster to adjust the compression of the spring.

9. The latch of claim 8, wherein the adjuster is a threaded screw.

10. The latch of claim 8, wherein the pin is normally received within a notch of the bolt.

11. The latch of claim 1, wherein the trigger is pivotally coupled to the housing of the latch configured to be coupled to the first panel, and wherein pivoting movement of the trigger disengages the locking pin from the bolt and the handle support to permit the handle support to move relative to the bolt and bypass the biasing mechanism to move the roller to the disengaged position.

12. The latch of claim 1, wherein the trigger includes a spring to bias a body of the trigger to an upright position where the pin of the trigger is engaged with the bolt and the handle support.

13. The latch of claim 12, wherein the housing is configured to be coupled to the first panel and the handle is pivotally coupled to the housing, and wherein the trigger is pivotally coupled to the handle and movement of the trigger against the spring of the trigger from the upright position to a depressed position disengages the pin from the handle support and the bolt to permit the handle to rotate relative to the housing.

14. The latch of claim 13, wherein the handle support is pivotally coupled to the handle and movement of the handle support with the handle causes the handle support to rotate about the axis and rotate the shaft to move the roller to the disengaged position.

15. The latch of claim 1, wherein the handle support includes in aperture for receiving a portion of the shaft, and wherein the shaft includes an aperture generally perpendicular to the axis and the latch further includes a pin received within the shaft to rigidly couple the shaft to the handle support.

16. The larch of claim 15, further including the housing configured to be coupled to the first panel and the handle being pivotally coupled to the housing, and wherein the handle support is coupled to the handle for movement with the handle.

17. The latch of claim 16, wherein the handle support includes a downward facing surface normally engaged with the pin of the trigger and the bolt includes an upward facing surface normally engaged with the pin of the trigger so that the bolt and handle support are prevented from moving relative to one another.

* * * * *